(12) United States Patent
Lukacs et al.

(10) Patent No.: US 8,910,238 B2
(45) Date of Patent: Dec. 9, 2014

(54) HYPERVISOR-BASED ENTERPRISE ENDPOINT PROTECTION

(71) Applicant: Bitdefender IPR Management Ltd., Nicosia (CY)

(72) Inventors: Sandor Lukacs, Floresti (RO); Dan H. Lutas, Cluj-Napoca (RO); Raul V. Tosa, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 15 days.

(21) Appl. No.: 13/676,008

(22) Filed: Nov. 13, 2012

(65) Prior Publication Data

US 2014/0137180 A1 May 15, 2014

(51) Int. Cl.
*G06F 17/00* (2006.01)

(52) U.S. Cl.
USPC ........ 726/1; 726/22; 726/23; 726/24; 726/25; 726/3; 726/2; 726/4; 726/11; 713/164; 713/168

(58) Field of Classification Search
CPC ....... G06F 21/57; G06F 21/64; G06F 21/552; G06F 21/53; H04L 63/0227; H04L 63/1408
USPC .................... 713/156; 709/225–229
See application file for complete search history.

(56) References Cited

U.S. PATENT DOCUMENTS

| | | | |
|---|---|---|---|
| 7,493,654 B2 * | 2/2009 | Bantz et al. .............. 726/4 |
| 7,783,735 B1 | 8/2010 | Sebes et al. |
| 7,797,748 B2 | 9/2010 | Zheng et al. |
| 8,079,030 B1 * | 12/2011 | Satish et al. .............. 718/1 |
| 8,204,480 B1 * | 6/2012 | Lindteigen et al. ....... 455/411 |
| 8,656,482 B1 * | 2/2014 | Tosa et al. ............... 726/15 |
| 2006/0095965 A1 * | 5/2006 | Phillips et al. ........... 726/22 |
| 2009/0164994 A1 | 6/2009 | Vasilevsky et al. |
| 2009/0254990 A1 * | 10/2009 | McGee .................... 726/22 |
| 2009/0307705 A1 * | 12/2009 | Bogner .................... 718/104 |
| 2010/0088757 A1 | 4/2010 | Grouzdev et al. |
| 2011/0258610 A1 * | 10/2011 | Aaraj et al. .............. 717/128 |

OTHER PUBLICATIONS

Rutkowska et al. "Qubes OS Architecture," Invisible Things Lab, Warsaw, Poland, Jan. 2010.

(Continued)

*Primary Examiner* — Farid Homayounmehr
*Assistant Examiner* — Lizbeth Torres-Diaz
(74) *Attorney, Agent, or Firm* — Law Office of Andrei D Popovici, PC

(57) ABSTRACT

Described systems and methods allow the detection and prevention of malware and/or malicious activity within a network comprising multiple client computer systems, such as an enterprise network with multiple endpoints. Each endpoint operates a hardware virtualization platform, including a hypervisor exposing a client virtual machine (VM) and a security VM. The security VM is configured to have exclusive use of the network adapter(s) of the respective endpoint, and to detect whether data traffic to/from the client VM comprises malware or is indicative of malicious behavior. Upon detecting malware/malicious behavior, the security VM may block access of the client VM to the network, thus preventing the spread of malware to other endpoints. The client system may further comprise a memory introspection engine configured to perform malware scanning of the client VM from the level of the hypervisor.

18 Claims, 8 Drawing Sheets

(56) References Cited

OTHER PUBLICATIONS

Citrix Systems, Intel. "Enhanced Security for Desktop Virtualization with Citrix XenClient and Intel vPro Technology," Citrix Systems, Intel, Santa Clara, CA, 2010. Archive.org indicates this article was available on Dec. 14, 2010.

Citrix Systems, Inc. "Citrix Announces XenClient 2 and XenClient XT," Citrix Systems, Inc, Santa Clara, CA, May 25, 2011.

Citrix Systems, Intel. "Secure, High-Performance Client Virtualization with Citrix XenClient XT* and 2nd Generation Intel® Core™ vPro™ Processors," Citrix Systems, Intel, Santa Clara, CA, 2011. Associated press release announcing XenClient XT is dated May 2011.

Citrix Systems. "Refactoring Sensitive Data Access: The Benefits of Virtualization Security," Citrix Systems Inc, Santa Clara, CA, 2011.

* cited by examiner

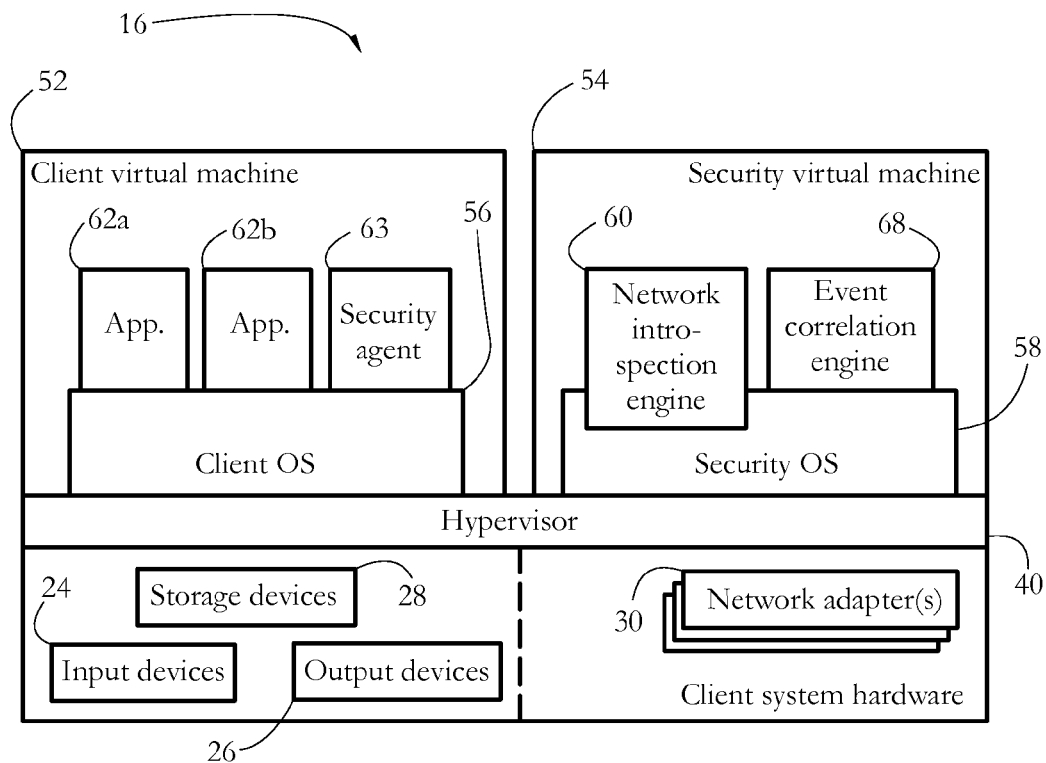
FIG. 3
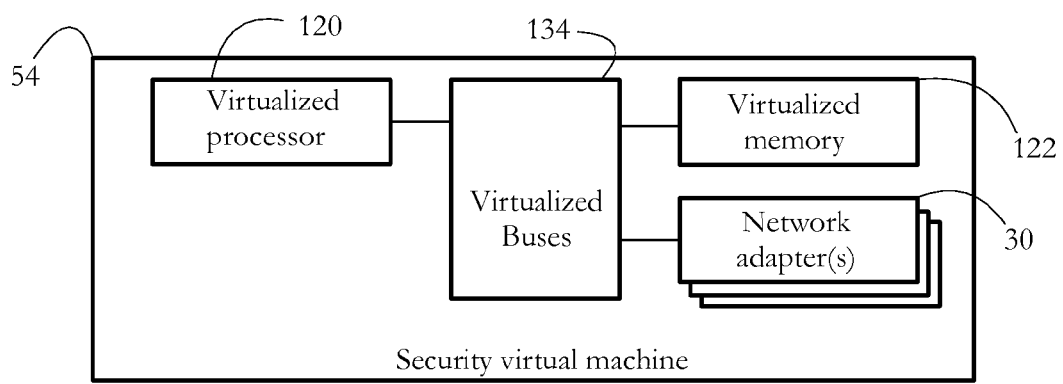
FIG. 4-A

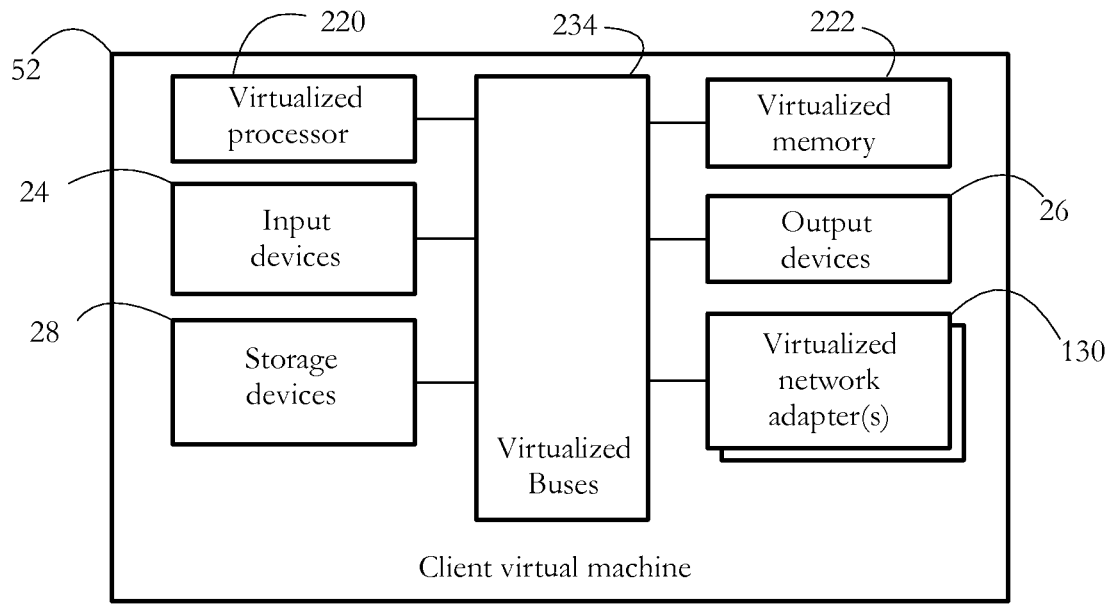
FIG. 4-B
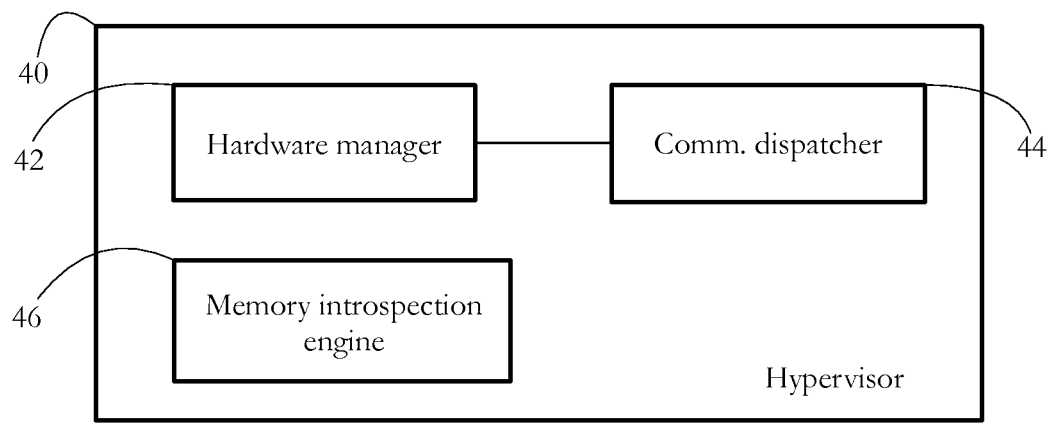
FIG. 5

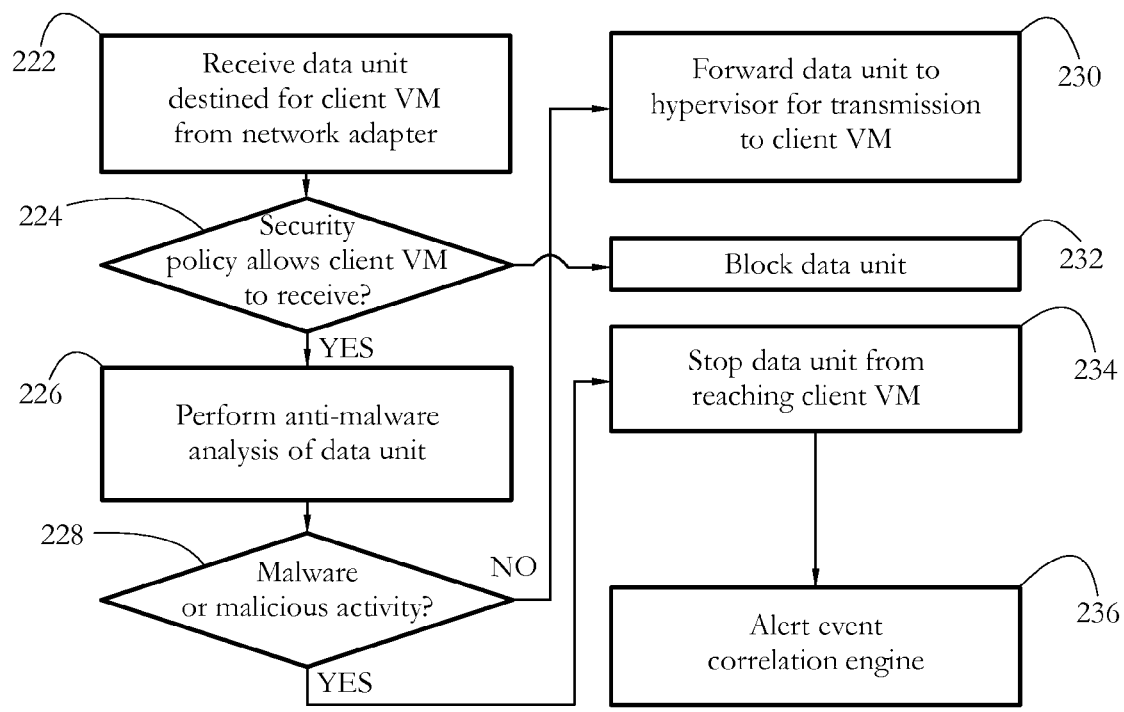
FIG. 9-A

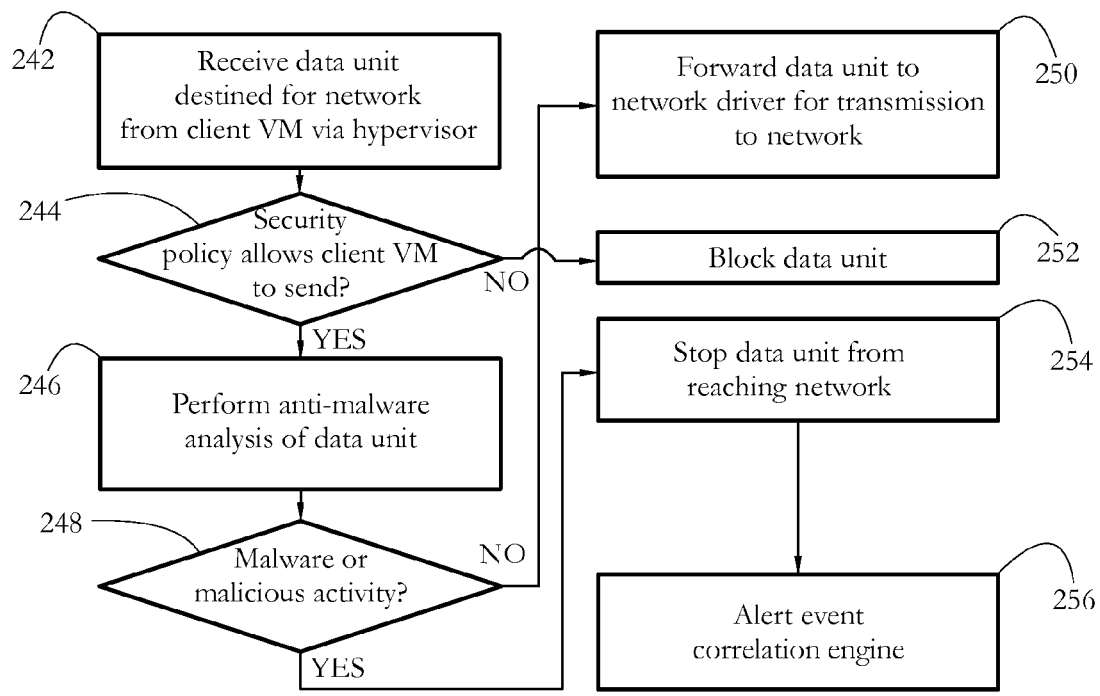
FIG. 9-B

HYPERVISOR-BASED ENTERPRISE ENDPOINT PROTECTION

BACKGROUND

The invention relates to systems and methods for protecting computer systems from malware, and in particular to anti-malware systems employing hardware virtualization technology.

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others.

Hardware virtualization technology allows the creation of simulated computer environments commonly known as virtual machines, which behave in many ways as physical computer systems. In typical applications such as server consolidation and infrastructure-as-a-service (IAAS), several virtual machines may run simultaneously on the same physical machine, sharing the hardware resources among them, thus reducing investment and operating costs. Each virtual machine may run its own operating system and/or software applications, separately from other virtual machines. Due to the steady proliferation of malware, each virtual machine operating in such an environment potentially requires malware protection.

Enterprise networks are increasingly using hardware virtualization technology, giving individual users access to computing resources from any location on the network, while protecting corporate data and facilitating network administration. In an exemplary application, instead of operating a computer system having a full-fledged operating system and applications, each user may operate a thin client endpoint acting as a terminal to a virtual machine running remotely on a central corporate location.

There is considerable interest in developing anti-malware solutions for hardware virtualization platforms, solutions which are robust, scalable, and adapted to any network configuration.

SUMMARY

According to one aspect, a client system comprises at least one processor configured to operate a hypervisor, the hypervisor configured to execute a client virtual machine (VM) and a security VM distinct from the client VM. The security VM is configurable by a centralized security manager executing on a remote server connected to the client system by a network, wherein the remote server is programmed to configure a plurality of client systems including the client system, and wherein the security VM is configured to control a network adapter of the client system according to a security policy received from the remote server. The security VM is further configured to receive a data unit from the network adapter, the data unit comprising a header and a payload, the data unit destined for the client VM; and in response to receiving the data unit, to determine whether the data unit is malicious according to a content of the payload. The security VM is further configured, when the data unit is not malicious, to transmit the data unit to the hypervisor for transmission to the client VM, and when the data unit is malicious, to send a security report to the remote server, the security report indicative of the maliciousness of the data unit, and to restrict access of the client VM to the network adapter according to the security policy. The hypervisor is further configured, in response to receiving the data unit from the security VM, to transmit the data unit to the client VM. The hypervisor further comprises a memory introspection engine configured to determine whether the client VM comprises malware according to a content of a section of memory of the client VM, and in response, when the client VM comprises malware, to send a security alert to the security VM.

According to another aspect, a server system comprises at least one processor programmed to remotely configure a plurality of client systems, wherein configuring a client system of the plurality of the client systems comprises sending a security policy to the client system, and wherein the client system comprises at least one processor configured to operate a hypervisor. The hypervisor is configured to execute a client virtual machine (VM) and a security VM distinct from the client VM, the security VM configured to control network adapter of the client system. The security VM is further configured to receive a data unit from the network adapter, the data unit comprising a header and a payload, the data unit destined for the client VM, and in response to receiving the data unit, to determine whether the data unit is malicious according to a content of the payload. The security VM is further configured, when the data unit is not malicious, to transmit the data unit to the hypervisor for transmission to the client VM, and when the data unit is malicious, to send a security report to the server system, the security report indicative of the maliciousness of the data unit, and to restrict access of the client VM to the network adapter according to the security policy. The hypervisor is further configured, in response to receiving the data unit from the security VM, to transmit the data unit to the client VM. The hypervisor further comprises a memory introspection engine configured to determine whether the client VM comprises malware according to a content of a section of memory of the client VM, and in response, when the client VM comprises malware, to send a security alert to the security VM.

According to another aspect, a method comprises employing at least one processor of a client system to form a hypervisor configured to expose a client virtual machine (VM) and a security VM distinct from the client VM. The security VM is configured to control a network adapter of the client system, the security VM configurable by a centralized security manager executing on a remote server connected to the client system by a network, wherein the remote server is programmed to configure a plurality of client systems including the client system, and wherein configuring the client system comprises the remote server sending a security policy to the client system. The method further comprises employing the security VM to receive a data unit from the network adapter, the data unit comprising a header and a payload, the data unit destined for the client VM; employing the security VM, in response to receiving the data unit, to determine whether the data unit is malicious according to a content of the payload; and in response, when the data unit is not malicious, employing the security VM to transmit the data unit to the hypervisor for transmission to the client VM, and when the data unit is malicious, employing the security VM to send a security report to the remote server, the security report indicative of the maliciousness of the data unit, and to restrict access of the client VM to the network adapter according to the security policy. The method further comprises employing the hypervisor, in response to receiving the data unit from the security VM, to transmit the data unit to the client VM. The hypervisor further comprises a memory introspection engine configured to determine whether the client VM comprises malware according to a content of a section of memory of the client VM, and in response, when the client VM comprises malware, to send a security alert to the security VM.

According to another aspect, a method comprises employing at least one processor of a server system to remotely configure a plurality of client systems connected to the server system by a network, wherein configuring a client system of the plurality of client systems comprises sending a security policy to the client system; and in response to configuring the plurality of client systems, employing at least one processor of the server system to receive a security report from the client system. The client system comprises a hypervisor configured to execute a client virtual machine (VM) and a security VM distinct from the client VM. The security VM is configured to control a network adapter of the client system and is further configured to receive a data unit from the network adapter, the data unit comprising a header and a payload, the data unit destined for the client VM; and in response to receiving the data unit, to determine whether the data unit is malicious according to a content of the payload. The security VM is further configured, in response, when the data unit is not malicious, to transmit the data unit to the hypervisor for transmission to the client VM, and when the data unit is malicious, to send the security report to the server system, the security report indicative of the maliciousness of the data unit, and to restrict access of the client VM to the network adapter according to the security policy. The hypervisor is further configured, in response to receiving the data unit from the security VM, to transmit the data unit to the client VM. The hypervisor further comprises a memory introspection engine configured to determine whether the client VM comprises malware according to a content of a section of memory of the client VM, and in response, when the client VM comprises malware, to send a security alert to the security VM.

BRIEF DESCRIPTION OF THE DRAWINGS

The foregoing aspects and advantages of the present invention will become better understood upon reading the following detailed description and upon reference to the drawings where:

FIG. 3 shows an exemplary hypervisor executing on a client system and exposing a client virtual machine and a security virtual machine, according to some embodiments of the present invention.

FIG. 4-A illustrates an exemplary configuration of a security virtual machine controlling at least one network adapter, according to some embodiments of the present invention.

FIG. 4-B illustrates an exemplary configuration of a client virtual machine, according to some embodiments of the present invention.

FIG. 5 illustrates exemplary components of the hypervisor of FIG. 3, according to some embodiments of the present invention.

FIG. 9-A shows an exemplary sequence of steps performed by the security virtual machine of FIG. 7 when receiving a data unit destined for the client virtual machine, according to some embodiments of the present invention.

FIG. 9-B shows an exemplary sequence of steps performed by the security virtual machine when receiving a data unit from the client virtual machine, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a hash is an output of a hash function. Unless otherwise specified, a hash function is a mathematical transformation mapping a sequence of symbols (e.g. characters, bits) into a number or bit string. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
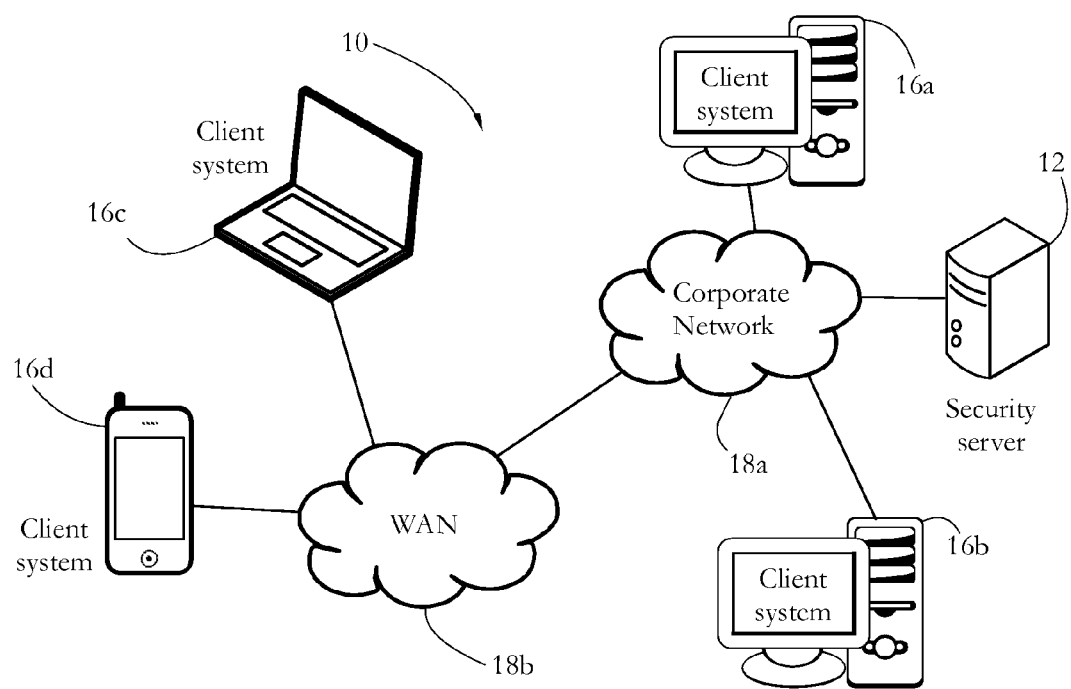
FIG. 1 shows an exemplary diagram of an anti-malware system comprising a plurality of client systems and a security server, according to some embodiments of the present invention.

FIG. 1 shows an exemplary anti-malware system 10 according to some embodiments of the present invention. System 10 comprises a security server 12 and a plurality of client systems 16a-d, all connected to networks 18a-b. Some client systems, such as client systems 16a-b in FIG. 1, may be physically located together, e.g. in an office building, and may be interconnected by a corporate network 18a, which may comprise a local area network (LAN).

Client systems 16a-d may represent end-user devices such as computers and mobile telephones, among others, each having a processor, memory, and storage. In some embodiments, each client system 16a-d may be used by a single user (e.g., an employee of a company), or several users may access the same client system 16a-d (e.g. in work shifts, sales points operated by multiple employees, etc.).

Some client systems, such as client systems 16c-d in FIG. 1, may access corporate network 18a remotely, e.g., from home or as a mobile client, and may do so via a wide area network (WAN) 18b, such as the Internet. Network 18a may operate in various degrees of isolation from network 18b, for example networks 18a-b may be separated by a firewall. Data exchanges between client systems 16a-d and security server 12 may take place over networks 18a-b, as shown in detail below.

Figure 2:
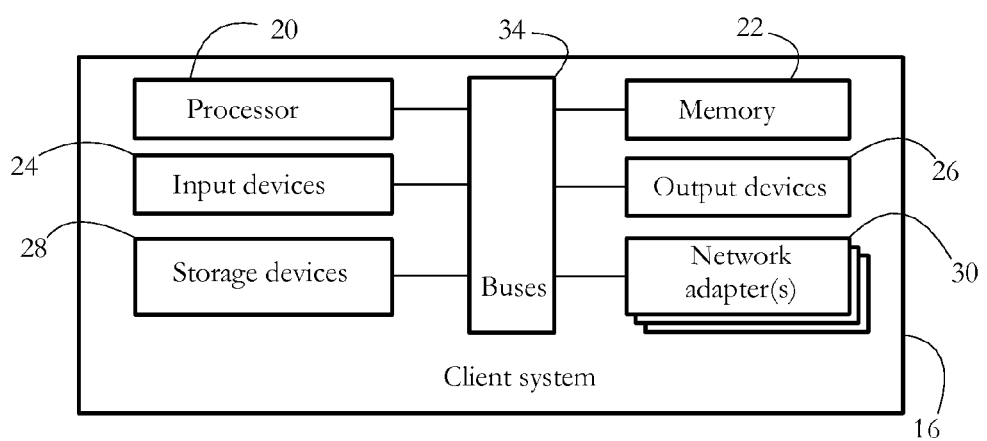
FIG. 2 illustrates an exemplary hardware configuration of a client system, according to some embodiments of the present invention.

FIG. 2 shows a hardware configuration of an exemplary client system 16, such as client systems 16a-d in FIG. 1, according to some embodiments of the present invention. System 16 represents a computer system for illustrative purposes; other client devices such as mobile telephones or tablets may have a different configuration. In some embodiments, system 16 comprises a processor 20, a memory unit 22, a set of input devices 24, a set of output devices 26, a set of storage devices 28, and at least one network adapter 30, all connected by a set of buses 34.

In some embodiments, processor 20 comprises a physical device (e.g. multi-core integrated circuit) configured to execute computational and/or logical operations with a set of signals and/or data. In some embodiments, such logical operations are delivered to processor 20 in the form of a sequence of processor instructions (e.g. machine code or other type of software). Memory unit 22 may comprise volatile computer-readable media (e.g. RAM) storing data/signals accessed or generated by processor 20 in the course of carrying out instructions. Input devices 24 may include computer keyboards, mice, and microphones, among others, including the respective hardware interfaces and/or adapters allowing a user to introduce data and/or instructions into system 16. Output devices 26 may include display devices such as monitors and speakers among others, as well as hardware interfaces/adapters such as graphic cards, allowing system 16 to communicate data to a user. In some embodiments, input devices 24 and output devices 26 may share a common piece of hardware, as in the case of touch-screen devices. Storage devices 28 include computer-readable media enabling the non-volatile storage, reading, and writing of software instructions and/or data. Exemplary storage devices 28 include magnetic and optical disks and flash memory devices, as well as removable media such as CD and/or DVD disks and drives. A set of network adapters 30 enables system 16 to connect to networks 18a-b and/or to other devices/computer systems. Buses 34 collectively represent the plurality of system, peripheral, and chipset buses, and/or all other circuitry enabling the inter-communication of devices 20-32 of client system 16. For example, buses 34 may comprise the northbridge connecting processor 20 to memory 22, and/or the southbridge connecting processor 20 to devices 24-30, among others.

FIG. 3 shows an illustrative software configuration of client system 16, according to some embodiments of the present invention. In some embodiments, a hypervisor 40 executes on the client system hardware. Hypervisor 40, also known in the art as a virtual machine monitor, comprises software allowing the multiplexing (sharing) by multiple virtual machines of hardware resources of client system 16, such as processor operations, memory, storage, input/output, and networking devices. In some embodiments, hypervisor 40 enables multiple virtual machines (VM) and/or operating systems (OS) to run concurrently on client system 16, with various degrees of isolation. Virtual machines are commonly known in the art as software emulations of actual physical machines/computer systems, each capable of running its own operating system and software independently of other VMs. Examples of popular hypervisors include the VMware ESXi™ from VMware Inc. and the open-source Xen hypervisor, among others.

Client system 16 further comprises a client VM 52 and a security VM 54, operating concurrently and exposed by hypervisor 40. While FIG. 3 shows just two VMs for simplicity, client system 16 may include multiple VMs 52, 54. The number of VMs may change during the operation of client system 16. In some embodiments, each client VM may have an associated security VM. A single security VM may service multiple client VMs executing concurrently on client system 16. In some embodiments, security VM 54 is configured to execute as long as there is at least a client VM operating on the respective client system. Hypervisor 40 may be configured to prevent client VM 52 from using network adapter(s) 30 when there is no security VM in operation.

In some embodiments, client VM 52 may execute a client operating system 56 and/or a set of software applications 62a-b concurrently and independently of other VMs running on client system 16. OS 56 comprises software that provides an interface to the (virtualized) hardware of client VM 52, and acts as a host for computing applications 62a-b running on the respective OS. Client OS 56 may comprise any widely available operating system such as Windows®, MacOS®, Linux®, iOS®, or Android™, among others. Applications 62a-b may include word processing, image processing, database, browser, and electronic communication applications, among others.

In some embodiments, a security agent 63 may execute on client OS 56 concurrently with applications 62a-b. Security agent 63 may be configured to interface with hypervisor 40, e.g. to receive from a memory introspection engine 46 executing within hypervisor 40 a security alert indicative of the fact that client VM 52 is infected with malware. In another example, hypervisor 40 may alert security agent 63 when security VM 54 determines (as shown below) that client VM 52 is conducting malicious transactions over network(s) 18a-b. To receive such a security alert from hypervisor 40, security agent 63 may employ any of a number of methods known in the art of virtualization. For example, hypervisor 40 may use an interrupt injection mechanism to notify agent 63 to receive the alert. In some embodiments, upon receiving communication from hypervisor 40, security agent 63 may display a message on an output device of client system 16.

In some embodiments, security VM 54 is launched by hypervisor 40 from an authenticated image stored on a computer-readable medium of client system 16, as shown in more detail below. In other embodiments, security VM 54 and/or hypervisor 40 are loaded from a secure location accessible via networks 18a-b, for instance using a pre-boot execution environment (PXE). Security VM 54 may execute a security operating system 58 providing a software interface to the (virtualized) hardware of security VM 54. In some embodiments, security OS 58 comprises OS components enabling routing of data between security VM 54 and client VM 52, as described below. OS 58 acts as a host for a network introspection engine 60, an event correlation engine 68, and possibly other applications or services. In some embodiments, security OS 58 may comprise a modified version of a widely available operating system such as Linux® or Android™, among others. Network introspection engine 60 is configured to intercept and analyze data traffic between client VM 52 and network(s) 18a-b. Some parts of network introspection engine 60 may execute at user privilege level, while other parts may execute at kernel privilege level. The operation of engine 60 is detailed below.

In some embodiments, event correlation engine 68 is configured to receive data, such as security alerts, from network introspection engine 60 and from memory introspection engine 46 executing within hypervisor 40, and to combine such data to determine whether client VM 52 comprises malware and/or is conducting malicious network transactions. Upon detecting malware/malicious activity, some embodiments of correlation engine 68 may formulate a security report according to data received from introspection engines 46 and/or 60, and to send the report to security server 12. To receive data from hypervisor 40, event correlation engine 68 may be configured to access a section of memory shared between engine 68 and hypervisor 40, or to use any other method known in the art of virtualization. For instance, hypervisor 40 may use an interrupt injection mechanism to notify event correlation engine 68 to receive an alert.

In some embodiments, software forming part of hypervisor 40 creates a plurality of virtualized, i.e., software-emulated devices, each virtualized device emulating a physical device 20-34, and assigns a set of virtual devices to each VM operating on client system 16. Thus, each VM 52, 54 operates as if it possesses its own set of physical devices, i.e., as a more or less complete computer system. In some embodiments, only a subset of hardware devices 20-34 is virtualized. Some hardware devices of client system 16 may be shared between virtual machines 52 and 54. In the embodiment of FIG. 3, some devices such as input devices 26 and output devices 28 of system 16 are used exclusively by client VM 52, while other devices, such as network adapter(s) 30, are used exclusively by security VM 54. Such partitioning of hardware between client and security VMs may be preferable for reasons of security, as discussed further below.

FIGS. 4-A-B illustrate exemplary configurations of security VM 54 and client VM 52, respectively, according to some embodiments of the present invention. VM 54 comprises a virtualized processor 120 and a virtualized memory unit 122, both connected by virtualized buses 134. Security VM 54 is configured to control at least one of network adapter(s) 30. In some embodiments, controlling the respective network adapter comprises security VM 54 having exclusive use of the respective adapter, e.g., being capable of restricting access of client VM 52 to the respective adapter. Control of the respective network adapter by security VM 54 may be enforced via hypervisor 40. Such a configuration may prevent client VM 52 for using adapter(s) 30 for malicious purposes, as detailed further below. Also, in the embodiment of FIG. 4-A, security VM 54 is configured without explicit input and output devices. In some embodiments, when such devices are required for operation by security OS 58, hypervisor 40 may present OS 58 with dummy input and/or output devices, wherein such dummy devices do not perform actual input and/or output operations. Configuring security VM 54 not to have access to input and/or output devices of system 16 may prevent a malicious entity (e.g., a Trojan or a user with malicious intent) from modifying a content of security VM 54 (e.g., by typing instructions into VM 54), or from viewing a content of security VM 54 by e.g., having VM 54 display the respective content on a screen.

In the embodiment of FIG. 4-B, client VM 52 comprises a virtualized processor 220, a virtualized memory unit 222, and a set of virtualized network adapters 130, while having exclusive use of input 24, output 26, and storage devices 28. Each virtualized network adapter 130 comprises a software emulation of a corresponding physical network adapter 30 of client system 16. In some embodiments, only a selected subset of network adapters is virtualized. For instance, hypervisor 40 may set up an emulated hardware configuration wherein client VM 52 can access network(s) 18a-b via a selected virtualized adapter 130.

Having hypervisor 40 present client OS 56 with emulated network adapter(s) 130 may allow hypervisor 40 to control the network traffic to and from client VM 52, while allowing client OS 56 to operate as if VM 52 possessed its own physical network adapter. For example, such a configuration may allow client VM 52 to execute an off-the-shelf version of client OS 56 (e.g. Microsoft Windows®), without a need for customizing OS 56 to interface with hypervisor 40. To save on development costs, some embodiments may use a virtualized network adapter, which represents a simplified device, without the full functionality of physical network adapter(s) 30 of system 16.

FIG. 5 shows an exemplary diagram of hypervisor 40 according to some embodiments of the present invention. Hypervisor 40 comprises a hardware manager 42, a communication dispatcher 44 connected to the hardware manager, and a memory introspection engine 46. In some embodiments, hardware manager 42 is configured to determine which physical devices (e.g., network adapter(s) 30, etc.) are allocated to either security VM 54 or client VM 52, and which devices need to be virtualized (e.g., processor 20, memory 22, etc.). In some embodiments, hardware manager 42 may identify a physical device according to the Peripheral Component Interconnect (PCI) device class of the respective device (e.g., 0x02 for network interfaces), and/or according to a PCI vendor and device IDs (e.g., 0x8086 for "Intel, Inc", 0x1076 for "Intel PRO/1000 MT Server Adapter").

Hardware manager 42 may be further configured to control and manage configuration parameters of certain devices of client system 16 during operation of VMs 52 and 54. Such parameters include, for each device of client system 16, input/output ports, memory mapped input/output (MMIO) zones, the PCI configuration space, interrupt requests (IRQ), and message-signaled interrupts (MSI), among others. For instance, hardware manager 42 may intercept attempts made by client OS 56 and/or security OS 58 to modify certain device parameters, e.g., to allocate a new MMIO zone for a certain PCI device, and configure the respective virtualized device accordingly.

In some embodiments, communication dispatcher 44 (FIG. 5) is configured to manage the two-way transfer of data between client VM 52 and network adapter(s) 30 of client system 16. Communication dispatcher 44 may oversee transfer of data from VMs 52, 54 to hypervisor 40 and from hypervisor 40 to VMs 52 and 54. The operation of dispatcher 44 will be described in more detail below.

In some embodiments, memory introspection engine 46 is configured to detect malware within client VM 52 from the level of hypervisor 40. Several such anti-malware methods are known in the art of virtualization. For instance, engine 46 may intercept a processor event such as a virtual machine exit event, transferring control of the processor from client VM 52 to hypervisor 40. Such events may be triggered for example when target software running within client VM 52 attempts to execute a privileged instruction, requiring processor root privilege level (such as VMX root mode on Intel platforms). By intercepting the VM exit event, hypervisor 40 may gain access to an address within the memory space of client VM 52, the memory space containing code of the target software currently being executed. By subsequently translating the address into an address within a memory space of hypervisor 40 (using, e.g, page tables maintained by client OS 56 and/or hypervisor 40), hypervisor 40 may have access to a content of a section of physical memory identified by the respective address and corresponding to target software. This respective section of memory may then be scanned for malware, e.g., to detect malware-identifying signatures.

Alternatively, memory introspection engine 46 may detect malware within client VM 52 by detecting an attempt by target software to modify a content of a protected memory region of VM 52. When client OS 56 is a Linux operating system, exemplary protected memory regions include: the kernel (read-only code and/or data such as sys_call_table), sysenter/syscall control registers, addresses int 0x80 (syscall) and/or int 0x01, among others. Exemplary protected regions on a Windows client OS 56 include: the kernel (read-only code and/or data, including the System Service Dispatch Table), various descriptor tables (e.g., interrupt, general and/or local), sysenter/syscall control registers and/or other registers such as an interrupt descriptor table register (IDTR), a global descriptor table register (GDTR), and a local descriptor table register (LDTR).

Memory introspection engine 46 may run part of the security scanning as a background process, and may be configured to perform anti-malware operations according to a time schedule (e.g., check the integrity of various kernel modules of client OS 54 every few seconds), or according to a set of heuristic rules (e.g., whenever a process is launched, or a specific driver is used, or a privileged instruction is executed). In some embodiments, engine 46 is configured, upon determining that client VM 52 comprises malware, to send a security alert to security agent 63 executing within client VM 52 and/or to event correlation engine 68 executing within security VM 54, which in turn can re-transmit the security alert onto security server 12. Sending such alerts from the level of hypervisor 40 to the level of VM's 52, 54 may be done e.g., via an interrupt injection mechanism.

Figure 6:
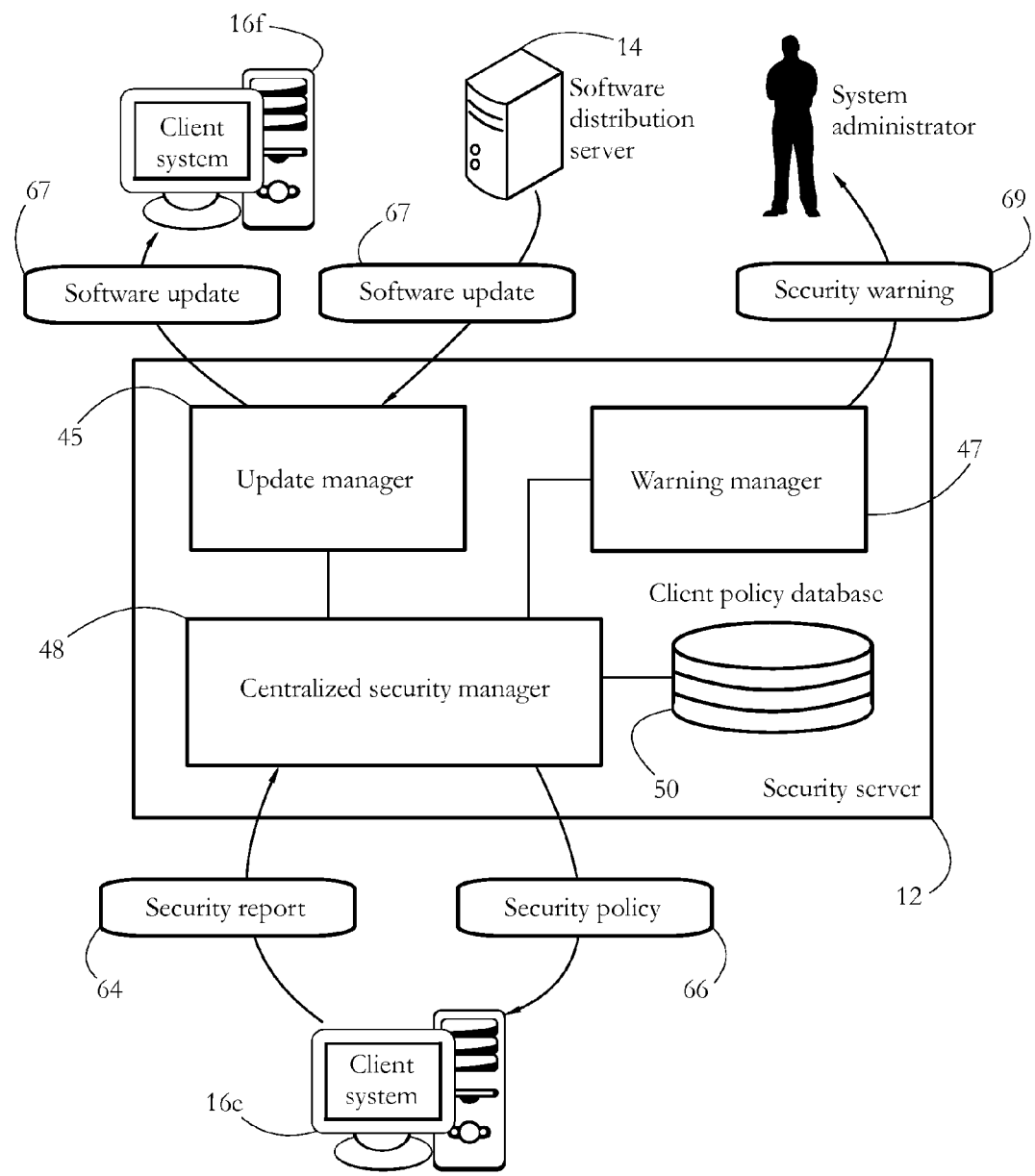
FIG. 6 shows exemplary components executing on the security server, as well as exemplary data exchanges between the security server and client systems, according to some embodiments of the present invention.

FIG. 6 shows a set of exemplary components executing on security server 12 (FIG. 1), as well as an exemplary data exchange between the security server and exemplary client systems 16e-f, according to some embodiments of the present invention. Systems 16e-f may represent any client system, such as client systems 16a-d in FIG. 1. System 16e may be distinct from system 16f, or systems 16e and 16f may both represent the same client system. In some embodiments, server 12 comprises a centralized security manager 48, an update manager 45, a warning manager 47, and a client policy database 50, all connected to security manager 48. Security manager 48 configures security VMs executing on each client system from a central location on network(s) 18a-b. In some embodiments, configuring security VM 54 of client system 16e (FIG. 6) comprises sending a security policy 66 to client system 16e over network(s) 18a-b and receiving a security report 64 from the respective client system. Some policies 66 may be issued in response to receiving security reports from the respective client systems; other policies 66 may be causally unrelated to security reports. Configuring system 16e may further include performing a remote attestation of client system 16e, as shown below.

In some embodiments, security policy 66 comprises a set of parameter values configuring the operation of security VM 54 in variety of circumstances. Security policy 66 may include an indicator of a procedure to be performed by security VM 54 when VM 54 detects malicious network traffic at adapter(s) 30 and/or when memory introspection engine 46 determines that client VM 52 comprises malware. In some embodiments, policy 66 may specify a level of access of client VM 52 to network adapter(s) 30. Each network adapter 30 of client system 16e may be covered by a distinct policy 66, or all adapters 30 may operate according to a common policy. For instance, policy 66 may instruct security VM 54 to block all network traffic to and/or from client VM 52 when client VM 52 comprises malware, or when network introspection engine 60 intercepts a malicious network packet. In some embodiments, policy 66 may include a set of network addresses, and a set of address-specific access levels. Such an exemplary policy 66 may allow client VM 52 to access certain network addresses (e.g., Internet sites), but may restrict VM 52 from connecting to another client system on network(s) 18a-b. Policy 66 may change during the operation of security VM 54, as instructed by server 12.

In some embodiments, security server 12 maintains a record of client-specific security policies 66 in the form of client policy database 50. Server 12 may also store a plurality of security reports 64 received from various clients over network(s) 18a-b. Exemplary client system 16e, for instance via its event correlation engine 68, may issue security report 64 and may send report 64 to server 12 following a security incident, for instance in response to its network introspection engine 60 intercepting malicious network traffic. Security report 64 may include an identifier of client system 16e (e.g., IP address), a timestamp of the incident, and/or an indicator of a type of incident (e.g, malicious network traffic, malformed packet, alert from memory introspection engine 46, etc.). In some embodiments, when the security incident involves malware executing on client VM 52, report 64 may comprise an indicator of a type of malware detected by engine 46 (e.g., virus, rootkit, etc.), and/or various information, such as copies of suspicious files, memory dumps, information about CPU execution context, network packet dumps, etc., information that can be used to analyze the security incident in more detail.

In some embodiments, security manager 48 analyzes security reports 64 coming from a plurality of client systems, and determines whether to change a set of security policies currently enforced on the respective client systems. When changes are operated to the respective policies, security manager 48 then sends updated policies 66 to the respective clients. Policy updates may affect not only the client system where a particular report originated, but occasionally also other client systems. For instance, when malware is detected on a particular client system, security manager 48 may decide to block access of the client VM executing on the respective client system to the network, but also to block other client systems on network(s) 18a-b from connecting to the respective client system. In such a case, security manager 48 will issue multiple security policies 66 and distribute them to multiple client systems. Such measures by manager 48 may prevent the spread of malware to other clients or servers connected to network(s) 18a-b.

In some embodiments, warning manager 47 is configured to inform a system administrator about security incidents occurring on client systems, such as client system 16e in FIG. 6. Informing the administrator may include displaying incident data on an output device such as a computer screen connected to server 12 and/or sending a security warning 69 to the administrator by other means, such as email and SMS, among others. Operation of warning manager 47 may be triggered by security manager 48 receiving security report 64.

In some embodiments, update manager 45 of security server 12 manages software updates and delivers such updates to client systems. A software update 67 (FIG. 6) may include anti-malware engine components (binaries) such as updated components of hypervisor 40 or of introspection engines 46, 60, as well as engine parameters such as updated malware signatures and/or behavior patterns, among others. Such updates may be retrieved from a remote software distribution server 14 over networks 18a-b, and delivered to client systems, such as client system 16f in FIG. 6, according to a schedule, or whenever they become available. Distribution server 14 may be maintained independently, by a security software developer such as the provider of software for hypervisor 40, security VM 54 and/or security server 12. In some embodiments, retrieval of software updates may be triggered by certain security incidents detected on client systems configured by security server 12.

Some embodiments of security server 12 may use the mechanism of software updates described above to perform pro-active malware scanning of client systems 16*a-d*. For example, when certain malicious actions are observed on a client system, a history of network activity and/or OS activity of the respective client may be gathered by components of security VM 54 executing on the respective client system and sent to server 12. In response to receiving such information, server 12 may analyze the history to construct a set of heuristic rules regarding network and/or OS behavior, rules which can be applied for early detection of malicious behavior on other clients. The new set of malware-detecting rules may be packaged as a software and/or policy update and delivered to client systems 16*a-d*. Some embodiments of server 12 may be further configured to communicate information about security incidents occurring on client systems 16*a-d* to a security software developer, e.g., via server 14. For instance, security server 12 may send data gathered from security reports 64, such as copies of files and/or network activity patterns to server 14, for detailed analysis. Such communication may facilitate the detection of emerging malware threats, and the rapid development of appropriate countermeasures.

Figure 7:
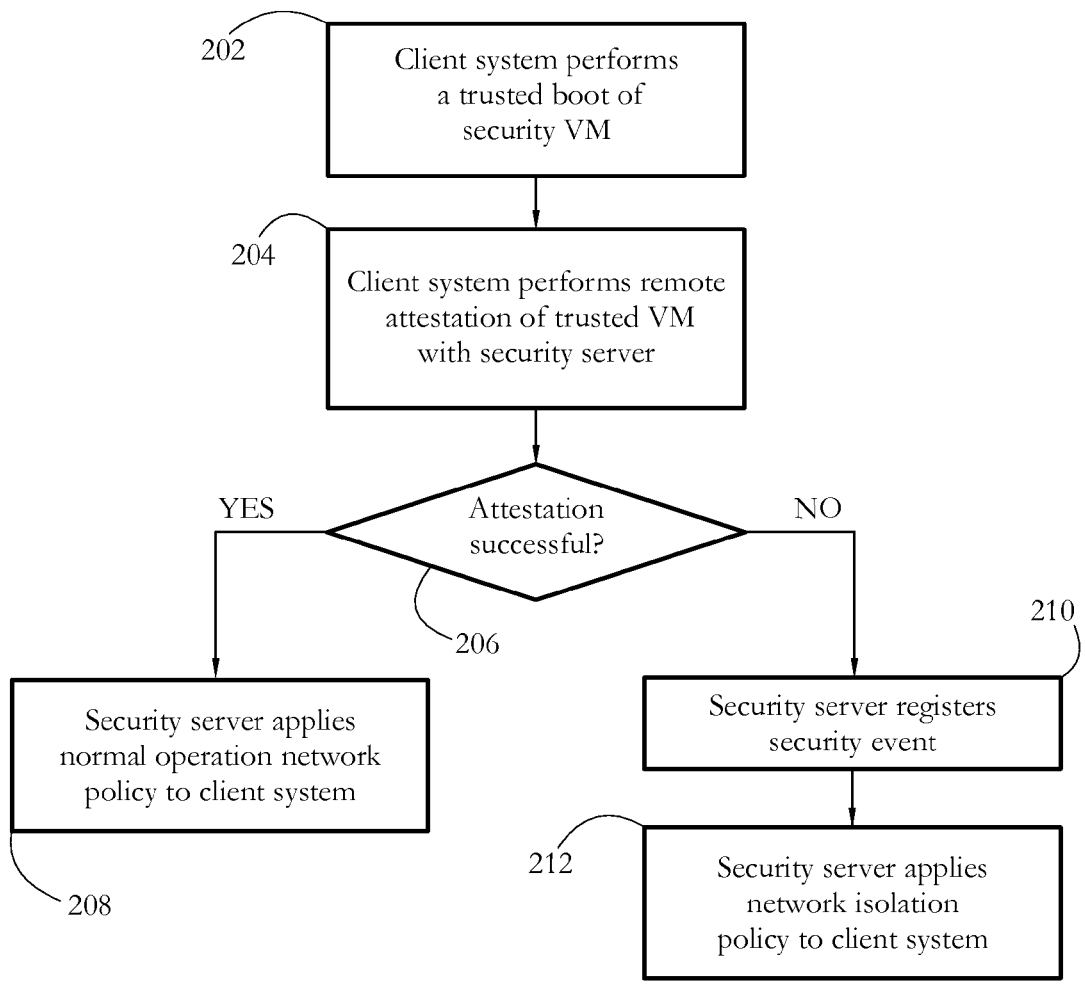
FIG. 7 shows an exemplary sequence of steps executed by the antimalware system of FIG. 1 to register a client system on the corporate network, according to some embodiments of the present invention.

FIG. 7 shows an exemplary sequence of steps performed by anti-malware system 10 (FIG. 1) to initialize exemplary client system 16 and to register client system 16 on networks 18*a-b*. In a step 202, client system 16 performs a trusted boot of security VM 54. In some embodiments, a trusted boot includes launching hypervisor 40 as well. Hypervisor 40 may form a part of an anti-malware package comprising several software modules. Such anti-malware software may be installed on a client system already running a widely available OS such as Windows®, Linux® or iOS®. Hypervisor 40 takes control of processor 20 at root privilege level (e.g., VMXroot on Intel platforms), and displaces other processes, including the OS, to non-root privilege level, thus creating a hardware virtualization platform such as the one depicted in FIG. 3. Following the launch of hypervisor 40, any OS executing on client system 16 prior to such installation becomes client OS 56, executing within the virtual environment of client VM 52. Hardware manager 42 sets up and manages virtualized hardware devices (e.g., FIG. 4-B) so client VM 52 may operate as if it were running directly on the physical hardware of system 16.

In some embodiments, performing a trusted boot of security VM 54 includes ensuring that system 16 loads a trusted image of VM 54, for instance an image that hasn't been tampered with (e.g., does not comprise malicious code). Several such techniques are known in the art. For instance, step 202 may include loading security VM 54 from an image file stored on computer-readable media used by system 16. Alternatively, the image file may be stored in a secure location accessible over networks 18*a-b*. The image file comprises a set of data representing a machine state of security VM 54. Before loading the image file onto memory, hypervisor 40 may compute a hash of the image file and compare the hash to a reference hash stored in a protected location of system 16, such as a trusted platform module (TPM) chip. When the hash of the image file matches the reference hash, indicating that the image file is authentic, hypervisor 40 launches trusted VM 54 by loading the image file into memory, to be executed by processor 20. Computing the hash may comprise applying a hash function to the image, or to a part of the image; exemplary hash functions include checksum, cyclic redundancy check (e.g., CRC32), and various cryptographic hash functions such as message-digest algorithms (e.g., MD5) and secure hash algorithms (e.g., SHA256). The reference hash is computed by applying the same algorithm on a certified version of security VM 54.

In a step 204, client system 16 engages in a remote attestation of security VM 54 with security server 12. In some embodiments, remote attestation comprises a set of operations executed by server 12 to determine whether client system 16 operates a certified version of VM 54, i.e., that the integrity of VM 54 has not been compromised by malware executing on system 16. In an exemplary attestation process, system 16 sends a copy of the hash computed in step 202 to server 12, together with possibly other data such as login credentials of a user of system 16, among others. Such data may be cryptographically signed with a unique secure key, such as the endorsement key of the TPM storing the reference hash, or a key provided by sever 12, or a key provided by a third party such as a certification authority. Upon receiving the data, server 12 may compare the hash received from client system 16 to a reference hash stored on server 12. A hash match indicates that hypervisor 40 and/or VM 54 executing on the respective client system are in a trustworthy state (e.g., unaffected by malware), and therefore attestation of client system 16 is successful. To perform such attestation operations, some embodiments of server 12 maintain a database of trusted hashes, such as hashes of security VM images in various configurations. Such hashes may be updated every time the respective VM images are updated.

In a step 206, security server 12 determines whether attestation of client 16 succeeded, and if no, proceeds to a step 210. When attestation was successful, in a step 208, server 12 registers client system 16 on network(s) 18*a-b* and applies normal network operation policy to client system 16. An exemplary normal network operation policy instructs security VM 54 of client system 16 to allow client VM 52 unrestricted access to network(s) 18*a-b*. When attestation did not succeed, in step 210, server 12 registers a security event indicating that client system 16 may be in an untrustworthy state, and in a step 212 applies a network isolation policy to client 16. Such network isolation policies may prevent the spread of malware on network(s) 18*a-b*.

An exemplary network isolation policy applied to client system 16 instructs clients distinct from client system 16 to reject network connection requests from system 16 and/or not to initiate network connections to client system 16. Such a policy may be implemented as a result of a failed attestation of system 16, by e.g. security server 12 sending policy updates to the respective client systems over network(s) 18*a-b*. In some embodiments, client systems distinct from client system 16 interrogate security server 12 before connecting to client system 16 to determine whether client system 16 is trusted; if client system 16 is not trusted, security server 12 responds negatively to such queries. In other embodiments, security server 12 may instruct other network entities, such as a Dynamic Host Configuration Protocol (DHCP) server and/or a router controlling the operation of network(s) 18*a-b* to restrict network access to/from the unattested client system.

Figure 8:
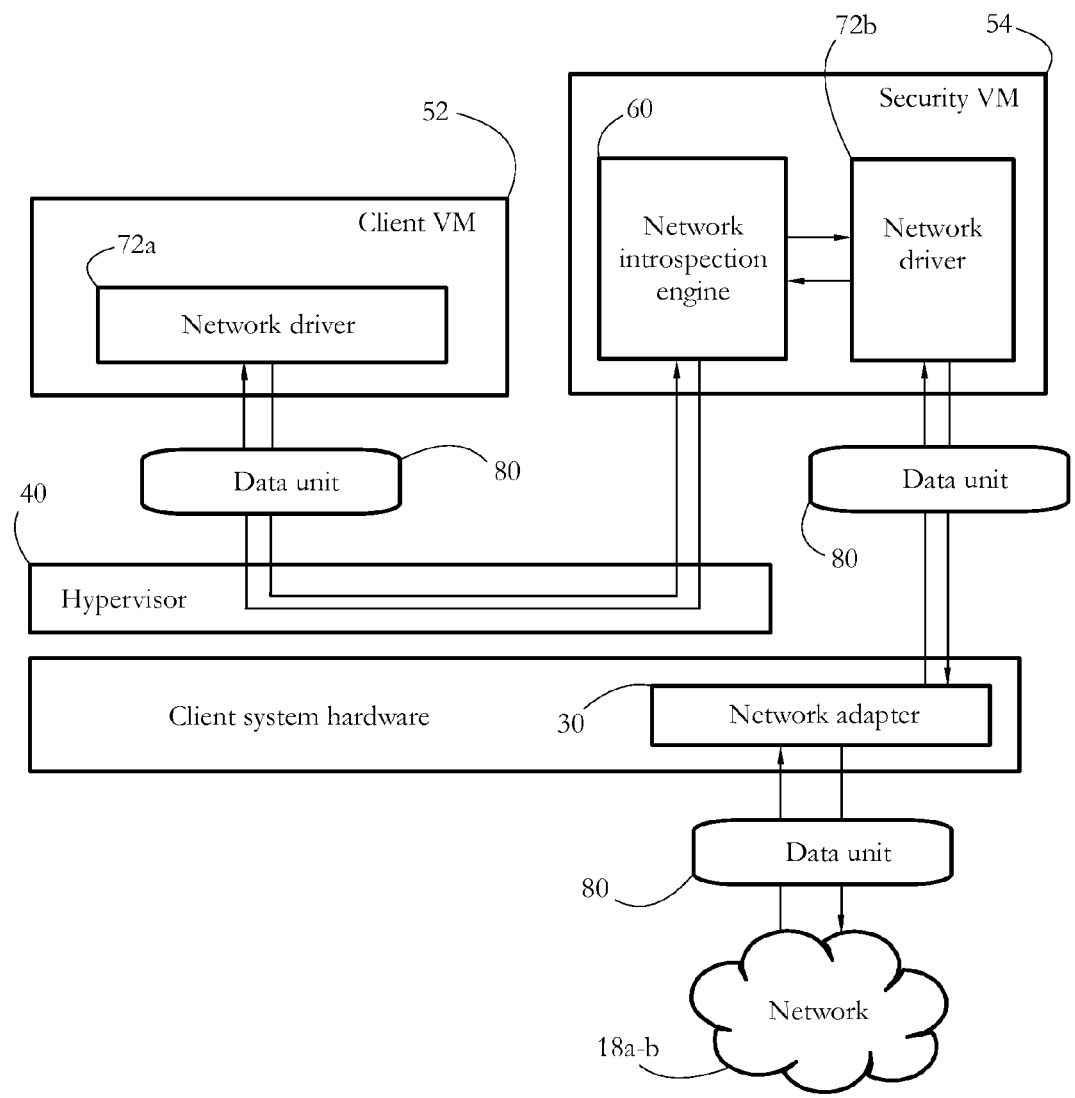
FIG. 8 shows an exemplary transmission of a data unit between the client virtual machine and the network, according to some embodiments of the present invention.

Following successful attestation of client system 16, two-way exchanges of data between client system 16 and network(s) 18*a-b* may proceed according to a mechanism illustrated in FIG. 8. In typical digital communication protocols, data circulating between two network entities is segmented into data units, such as data packets. Each data unit may comprise a header and a payload, the header including administrative information such as network routing addresses, and the payload comprising a fragment of the data itself. The size, formatting, and/or semantics of data units may be protocol-specific. In some embodiments, data traffic entering and/or exiting client VM 52 is routed by hypervisor 40 via security VM 54, with network introspection engine 60 analyzing said data for indicators of malicious activity or intent. Since security VM 54 is configured to have exclusive use of network adapter(s) 30, VM 54 may effectively control network traffic entering and/or exiting client VM 52.

When operating in send mode, an exemplary client VM 52 may use a network driver 72a of client OS 56 to send a data unit 80 via to at least one of virtualized network adapter(s) 130 configured and controlled by hypervisor 40. Communication dispatcher 44 of hypervisor 40 then picks up data unit 80 at adapter(s) 130 and forwards data unit 80 to network introspection engine 60 operating within security VM 54. After analyzing data unit 80 and determining that data unit 80 is not indicative of malware, engine 60 may send data unit 80 to a network driver 72b, which may be a component of security OS 58. Driver 72b then employs at least one of network adapter(s) 30 to transmit data unit 80 over network(s) 18a-b.

To transfer data unit 80 from hypervisor 40 to security VM 54, some embodiments of the present invention use an interrupt injection mechanism to notify network introspection engine 60 of VM 54, e.g. through a dedicated software module, that data is available for sending over network(s) 18a-b. Several such interrupt injection techniques are known in the art of virtualization; they represent a subclass of vectored-event injection mechanisms, which inject processor events into a virtual machine when transferring control of the processor from a hypervisor to a virtual machine controlled by said hypervisor (in the present example, from hypervisor 40 onto security VM 54).

In an exemplary receiving mode, security VM 54 receives data unit 80 from the network via at least one of network adapter(s) 30 and network driver 72b. Having exclusive use of adapter(s) 30, VM 54 may receive network traffic destined for client VM 52, but also traffic destined for VM 54, such as security policies 66 sent by security server 12. After determining that data unit 80 is destined for client system 52, software components of security VM 54 may forward data unit 80 to network introspection engine 60 for analysis. When data unit 80 is not indicative of malware, engine 60 may make data unit 80 available to hypervisor 40. Next, communication dispatcher 44 of hypervisor 40 forwards unit 80 to a respective virtual network adapter 130 of VM 52. Network driver 72a may then forward data 80 unit to its destination, e.g., a web browsing application executing in client OS 56.

To send data unit 80 from security VM 54 to hypervisor 40, as illustrated in FIG. 8, some embodiments of the present invention employ interception by hypervisor 40 of VM exit processor events, as described above in relation to the operation of memory introspection engine 46. For instance, engine 60 and/or other components of security VM 54 may include instructions (such as VMCall and/or VMFunc on Intel platforms) which transfer control of the processor to hypervisor 40, calling on hypervisor 40 to receive data unit 80 from security VM 54. In some embodiments, data unit 80 is transferred from VM 54 to hypervisor 40 through memory pages shared by VM 54 and hypervisor 40.

FIGS. 9-A-B show exemplary sequences of steps carried out by network introspection engine 60 according to some embodiments of the present invention. Engine 60 is configured to determine whether data traffic between client VM 52 and network(s) 18a-b comprises malware and/or whether such data traffic is indicative of malicious behavior. In addition, engine 60 may enforce a security policy as instructed by security server 12, e.g., restricting data traffic to and/or from client VM 52 upon detecting malware and/or malicious behavior.

FIG. 9-A illustrates the operation of engine 60 when intercepting data circulating from the network to client VM 52, according to some embodiments of the present invention. In a step 222, network introspection engine 60 receives data unit 80 destined for client VM 52 from at least one of adapter(s) 30, e.g. via network driver 72b of security OS 58. In some embodiments, step 222 includes reconstructing a communication protocol corresponding to data unit 80 (e.g., IP, TCP, UDP, HTTP, SMTP etc.). In some embodiments, such reconstruction may include de-multiplexing network traffic, grouping such traffic according to port indicators and/or by network adapter, and re-assembling network packets so they can be interpreted in the context of their respective communication protocol. In a step 224, engine 60 determines whether client VM 52 is allowed to receive data unit 80 according to the current security policy in effect on client system 16, and if no, in a step 232 engine 60 may block data unit 80, e.g. by dropping unit 80.

When the current security policy allows client VM 52 to receive data, in a step 226, engine 60 performs anti-malware analysis of data unit 80. In some embodiments, anti-malware analysis comprises detecting malware and/or malicious behavior related to data unit 80, and may employ any anti-malware method known in the art. For instance, engine 60 may check a payload of data unit 80 against a reference set of malware-identifying signatures (data patterns). Finding a malware-identifying pattern/signature within the payload may indicate that the data transmission comprising data unit 80 is malicious, e.g., that the respective data transmission includes a virus or worm. Alternative anti-malware methods include determining whether data unit 80 is malformed, or whether data unit 80 does not conform in some other way to a predetermined communication standard. Malformed data transmission may be an indicator of malicious behavior, since such transmission may cause certain types of errors on the receiving end of the transmission, errors which may be exploited for malicious purpose. Other heuristic methods may be applied to data unit 80 to determine whether it is indicative of malicious behavior. Such heuristics may include statistical analysis and/or identification of temporal usage patterns of a network resource by client VM 52. For instance, a client VM accessing port 25 (SMTP) multiple times during a short time interval may be suspected of sending unsolicited communication (spam).

In a step 228, engine 60 determines whether step 226 indicates malware and/or malicious activity, and if yes, engine 60 proceeds to a step 234 described below. When no malware or malicious activity was detected, in a step 230 network introspection engine 60 forwards data unit 80 to hypervisor 40 for transmission to client VM 52, using e.g. the mechanism described above in relation to FIG. 8. When data unit 80 is malicious and/or client VM is affected by malware as determined by memory introspection engine 46, in a step 234 engine 60 stops data unit 80 from reaching client VM 52. Step 234 may include matching a course of action to a type of malware/malicious behavior detected in step 226, according to the security policy currently in effect on client system 16. For instance, for certain types of behavior (e.g., a malformed packet on TCP port 80), the current security policy may instruct engine 60 to allow client VM 52 to continue to receive network communication from the same source, while in other instances, such as when data unit 80 comprises malware, the current policy may restrict client VM 52 from receiving any communication.

In a step 236, network introspection engine 60 may send a security alert to event correlation engine 68, the alert comprising data indicative of the security incident identified in step 226 (e.g, data unit 80 comprises malware). Event correlation engine 68 may subsequently formulate and send a security report 64 related to the incident detected in step 226 to security server 12.

FIG. 9-B illustrates an exemplary operation of network introspection engine 60 when sending data from client VM 52 to network(s) 18a-b. In a step 242, engine 60 receives data unit 80 destined for network(s) 18a-b from client VM 52 via hypervisor 40, e.g. via network driver 72a of client OS 56 and the interrupt injection mechanism described above in relation to FIG. 8. In a step 244, engine 60 determines whether client VM 52 is allowed to send data unit 80 according to the current security policy in effect on client system 16, and if no, in a step 252 engine 60 may block data unit 80.

When the current security policy allows client VM 52 to send data over the network, in a step 246, engine 60 performs anti-malware analysis of data unit 80, as described above. A step 248 determines whether client system 16 comprises malware and/or performs malicious activity. When no such malware/activity is detected, in a step 250 network introspection engine 60 forwards data unit 80 to network driver 72b of security OS 58 for transmission to network(s) 18a-b. When data unit 80 is malicious, in a step 254 engine 60 stops data unit 80 from reaching network(s) 18a-b. Next, in a step 254, network introspection engine 60 sends an alert to event correlation engine 68, the alert including data indicative of the security incident detected in step 246. Event correlation engine may then send a security report to security server 12.

The exemplary systems and methods described above allow preventing the spread of malware and/or malicious behavior within a network comprising multiple computing systems. An exemplary such network is an enterprise network including a multitude of computing endpoints, such as desktop computers and mobile computing and/or telecom devices. In some embodiments of the present invention, each endpoint (client system) operates a hardware virtualization platform, including a client virtual machine (VM) and a security VM. The security VM executing on each client system is remotely configurable by a central security solution operating on a server system on the network.

In some embodiments, the security VM is configured to detect malware and/or malicious activity in network traffic to/from the respective client system, and when such malware or activity is detected, to restrict access of the client system to the network. Such action on the part of individual security VMs distributed within the network may effectively prevent the spread of malicious activity over the network and/or may prevent leakage of valuable business data by selectively disconnecting malicious endpoints from the network.

In some embodiments of the present invention, the client VM may execute an off-the-shelf operating system (OS) such as MS Windows®, or MacOS®, thus keeping the setup and administration costs of the enterprise network low. The security VM may employ an open-source OS such as Linux®, customized to perform routing of data traffic to/from the client VM through the security VM, as described above.

In conventional systems, malware may operate at the same processor privilege level as other software, including communication modules, and may therefore interfere in the operation of such software. For instance, in such systems, malware may subvert an attempt to control and/or block network traffic to/from the respective system. By contrast, in some embodiments of the present invention, a trusted hypervisor operates at root privilege level on every client system, while all other software executing on the respective client system (including malware) is removed to lesser privilege levels. In some embodiments, launching the security VM comprises performing an integrity check of the respective VM. The security VM is launched only when an image of said VM is found to be identical to a reference, malware-free image attested by the security server.

By giving the security VM exclusive use of a network adapter of the client system, and by routing all data traffic to/from the client through the security VM, some embodiments of the present invention allow for an efficient control of malicious network traffic and/or activity. In return, the client VM executing concurrently with the security VM may have exclusive use over input and/or output devices of the respective client system. For instance, in some embodiments, only the client VM exposes a user interface. Such a configuration may prevent a user with malicious intent from displaying a content of the security VM, or from modifying a content of the security VM from within the client VM.

In conventional network security applications, a firewall may be used to restrict access of a computer system to a network. In such applications, the decision to allow or to block access is typically taken according to a routing indicator, such as a network address of a data packet. By contrast, in some embodiments of the present invention, the decision whether a data packet is malicious comprises analyzing a content of the payload of the respective data packet, by e.g., detecting a malware-indicative signature/data pattern within the packet. Such analysis may be combined with memory introspection carried out from the level of the hypervisor. By scanning the memory of the client VM for indications of malware, some embodiments of the present invention may increase the likelihood of detecting malicious behavior, and of preventing the spread of malware over the network.

It will be clear to one skilled in the art that the above embodiments may be altered in many ways without departing from the scope of the invention. Accordingly, the scope of the invention should be determined by the following claims and their legal equivalents.

What is claimed is:

1. A client system comprising at least one processor configured to operate a hypervisor, the hypervisor configured to execute:
   a client virtual machine (VM); and
   a security VM distinct from the client VM, the security VM configurable by a centralized security manager executing on a remote server connected to the client system by a network, wherein the remote server is programmed to configure a plurality of client systems including the client system, wherein the security VM is configured to control a network adapter of the client system according to a security policy received from the remote server, and wherein the security VM is further configured to:
      receive a data unit from the network adapter, the data unit comprising a header and a payload, the data unit destined for the client VM,
      in response to receiving the data unit, determine whether the data unit is malicious according to a content of the payload,
      in response, when the data unit is not malicious, transmit the data unit to the hypervisor for transmission to the client VM, and
      in response, when the data unit is malicious, send a security report to the remote server, the security report indicative of the maliciousness of the data unit, and restrict access of the client VM to the network adapter according to the security policy, wherein the hypervisor is further configured, in response to receiving the data unit from the security VM, to transmit the data unit to the client VM, wherein the hypervisor comprises a memory introspection engine configured to:

determine whether the client VM comprises malware according to a content of a section of memory of the client VM, and in response, when the client VM comprises malware, send a security alert to the security VM, and wherein the hypervisor is configured to prevent the client VM from using the network adapter when the security VM is not in operation.

2. The client system of claim 1, wherein the security VM is further configured, in response to the hypervisor sending the security alert, to restrict access of the client VM to the network adapter.

3. The client system of claim 1, wherein the security policy is determined according to the security report.

4. The client system of claim 1, wherein the security VM is further configured to:

receive a second security policy from the remote server, the second security policy instructing the security VM to restrict network access of the client VM to a second client system of the plurality of client systems, and in response, restrict network access of the client VM to the second client system according to the second security policy.

5. The client system of claim 1, wherein the hypervisor is further configured to:

intercept an attempt of the client VM to send a second data unit to the network adapter, the second data unit comprising a second header and a second payload, and in response to intercepting the attempt, transmit the second data unit to the security VM, and wherein the security VM is further configured, in response to receiving the second data unit, to:

determine whether the second data unit is malicious according to a content of the second payload, and in response, when the second data unit is not malicious, transmit the second data unit to the network adapter.

6. The client system of claim 1, wherein the client VM comprises a security agent, the security agent configured to receive from the hypervisor a report indicating whether the client VM comprises malware, and in response, to display a content of the report on an output device of the client system.

7. A server system comprising at least one processor programmed to remotely configure a plurality of client systems, wherein configuring a client system of the plurality of the client systems comprises sending a security policy to the client system, and wherein the client system comprises at least one processor configured to operate a hypervisor, the hypervisor configured to execute:

a client virtual machine (VM); and a security VM distinct from the client VM, the security VM configured to control a network adapter of the client system, and further configured to:

receive a data unit from the network adapter, the data unit comprising a header and a payload, the data unit destined for the client VM, in response to receiving the data unit, determine whether the data unit is malicious according to a content of the payload, in response, when the data unit is not malicious, transmit the data unit to the hypervisor for transmission to the client VM, and in response, when the data unit is malicious, send a security report to the server system, the security report indicative of the maliciousness of the data unit, and in response to receiving the security policy, restrict access of the client VM to the network adapter according to the security policy, wherein the hypervisor is further configured, in response to receiving the data unit from the security VM, to transmit the data unit to the client VM, wherein the hypervisor comprises a memory introspection engine configured to:

determine whether the client VM comprises malware according to a content of a section of memory of the client VM, and in response, when the client VM comprises malware, send a security alert to the security VM, and wherein the hypervisor is configured to prevent the client VM from using the network adapter when the security VM is not in operation.

8. The server system of claim 7, further configured to:
perform an attestation of the client system; and
determine the security policy according to a result of the attestation.

9. The server system of claim 7, further configured to determine the security policy according to the security report received from the client system.

10. The server system of claim 7, further configured to:
in response to receiving the security report from the client system, retrieve a software update from a remote software distribution server; and in response, transmit the update to the client system over the network.

11. The server system of claim 7, further configured, in response to receiving the security report from the client system, to send a second security policy to a second client system of the plurality of client systems, the second security policy restricting network access of the second client system to the client system.

12. The server system of claim 7, further configured, in response to receiving the security report from the client system, to send an electronic message to a system administrator, the electronic message determined according to the security report.

13. The server system of claim 7, wherein the security VM is further configured, in response to the hypervisor sending the security alert, to restrict access of the client VM to the network adapter.

14. The server system of claim 7, wherein the security VM is further configured to:

receive a second security policy from the remote server, the second security policy indicating that a second client system of the plurality of client systems is malicious, and in response, restrict access of the client VM to the second client system according to the second security policy.

15. The server system of claim 7, wherein the hypervisor is further configured to:

intercept an attempt of the client VM to send a second data unit to the network adapter, the second data unit comprising a second header and a second payload, and in response to intercepting the attempt, transmit the second data unit to the security VM, and wherein the security VM is further configured, in response to receiving the second data unit, to:
determine whether the second data unit is malicious according to a content of the second payload, and
in response, when the second data unit is not malicious, transmit the second data unit to the network adapter.

16. The server system of claim 7, wherein the client VM comprises a security agent, the agent configured to receive from the hypervisor a report indicating whether the client VM comprises malware, and in response, to display a content of the report on an output device of the client system.

17. A method comprising employing at least one processor of a client system to form a hypervisor configured to expose:
a client virtual machine (VM); and
a security VM distinct from the client VM, the security VM configured to control a network adapter of the client system, the security VM configurable by a centralized security manager executing on a remote server connected to the client system by a network, wherein the remote server is programmed to configure a plurality of client systems including the client system, and wherein configuring the client system comprises the remote server sending a security policy to the client system;
wherein the method further comprises:
employing the security VM to receive a data unit from the network adapter, the data unit comprising a header and a payload, the data unit destined for the client VM,
employing the security VM, in response to receiving the data unit, to determine whether the data unit is malicious according to a content of the payload, and in response,
when the data unit is not malicious, to transmit the data unit to the hypervisor for transmission to the client VM, and
when the data unit is malicious,
to send a security report to the remote server, the security report indicative of the maliciousness of the data unit, and
to restrict access of the client VM to the network adapter according to the security policy, and
wherein the method further comprises employing the hypervisor, in response to receiving the data unit from the security VM, to transmit the data unit to the client VM,
wherein the hypervisor further comprises a memory introspection engine configured to:
determine whether the client VM comprises malware according to a content of a section of memory of the client VM, and
in response, when the client VM comprises malware, send a security alert to the security VM, and
wherein the hypervisor is configured to prevent the client VM from using the network adapter when the security VM is not in operation.

18. A method comprising:
employing at least one processor of a server system to remotely configure a plurality of client systems connected to the server system by a network, wherein configuring a client system of the plurality of client systems comprises sending a security policy to the client system; and
in response to configuring the plurality of client systems, employing at least one processor of the server system to receive a security report from the client system,
wherein the client system comprises a hypervisor configured to execute:
a client virtual machine (VM); and
a security VM distinct from the client VM, the security VM configured to control a network adapter of the client system and further configured to:
receive a data unit from the network adapter, the data unit comprising a header and a payload, the data unit destined for the client VM,
in response to receiving the data unit, determine whether the data unit is malicious according to a content of the payload,
in response, when the data unit is not malicious, transmit the data unit to the hypervisor for transmission to the client VM, and
in response, when the data unit is malicious,
send the security report to the server system, the security report indicative of the maliciousness of the data unit, and
restrict access of the client VM to the network adapter according to the security policy,
wherein the hypervisor is further configured, in response to receiving the data unit from the security VM, to transmit the data unit to the client VM,
wherein the hypervisor comprises a memory introspection engine configured to:
determine whether the client VM comprises malware according to a content of a section of memory of the client VM, and
in response, when the client VM comprises malware, send a security alert to the security VM, and
wherein the hypervisor is configured to prevent the client VM from using the network adapter when the security VM is not in operation.

* * * * *